July 2, 1963  H. HUBBELL  3,096,132
SEALED ELECTRICAL RECEPTACLES
Filed May 25, 1959  2 Sheets-Sheet 1
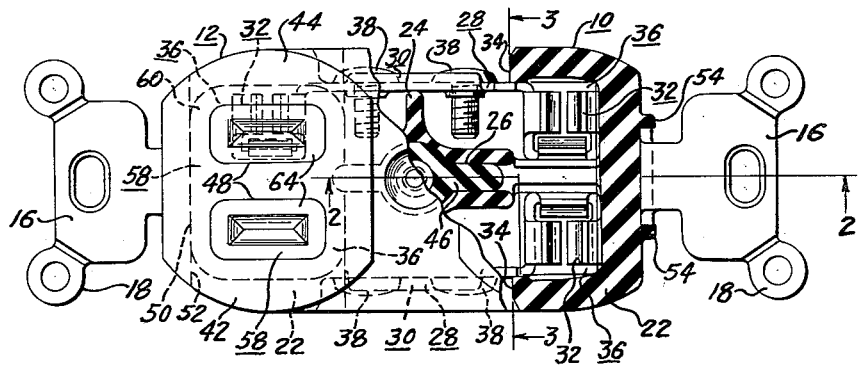
Fig. 1
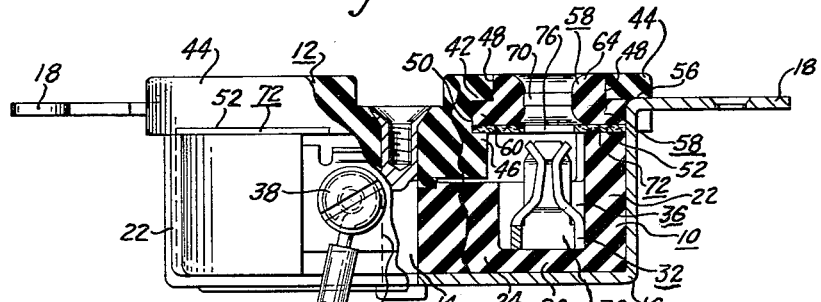
Fig. 2
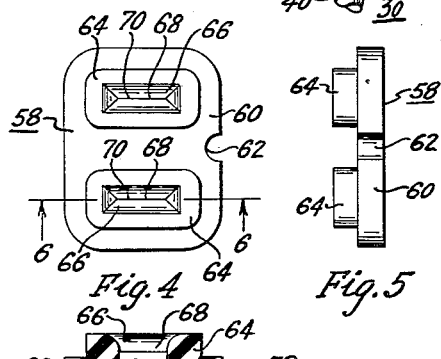
Fig. 4
Fig. 5
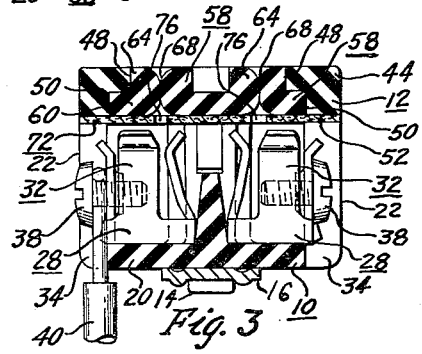
Fig. 3
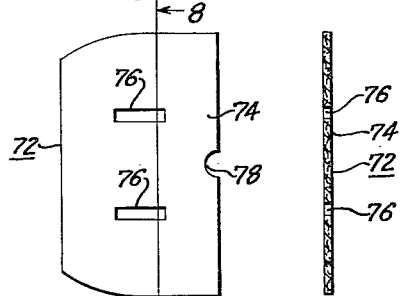
Fig. 6 / Fig. 7 / Fig. 8
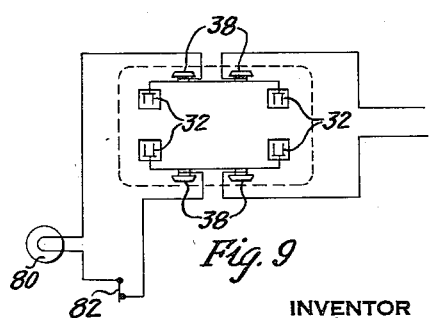
Fig. 9
INVENTOR
Harvey Hubbell
BY
Wooster, Davis & Cifelli
ATTORNEYS

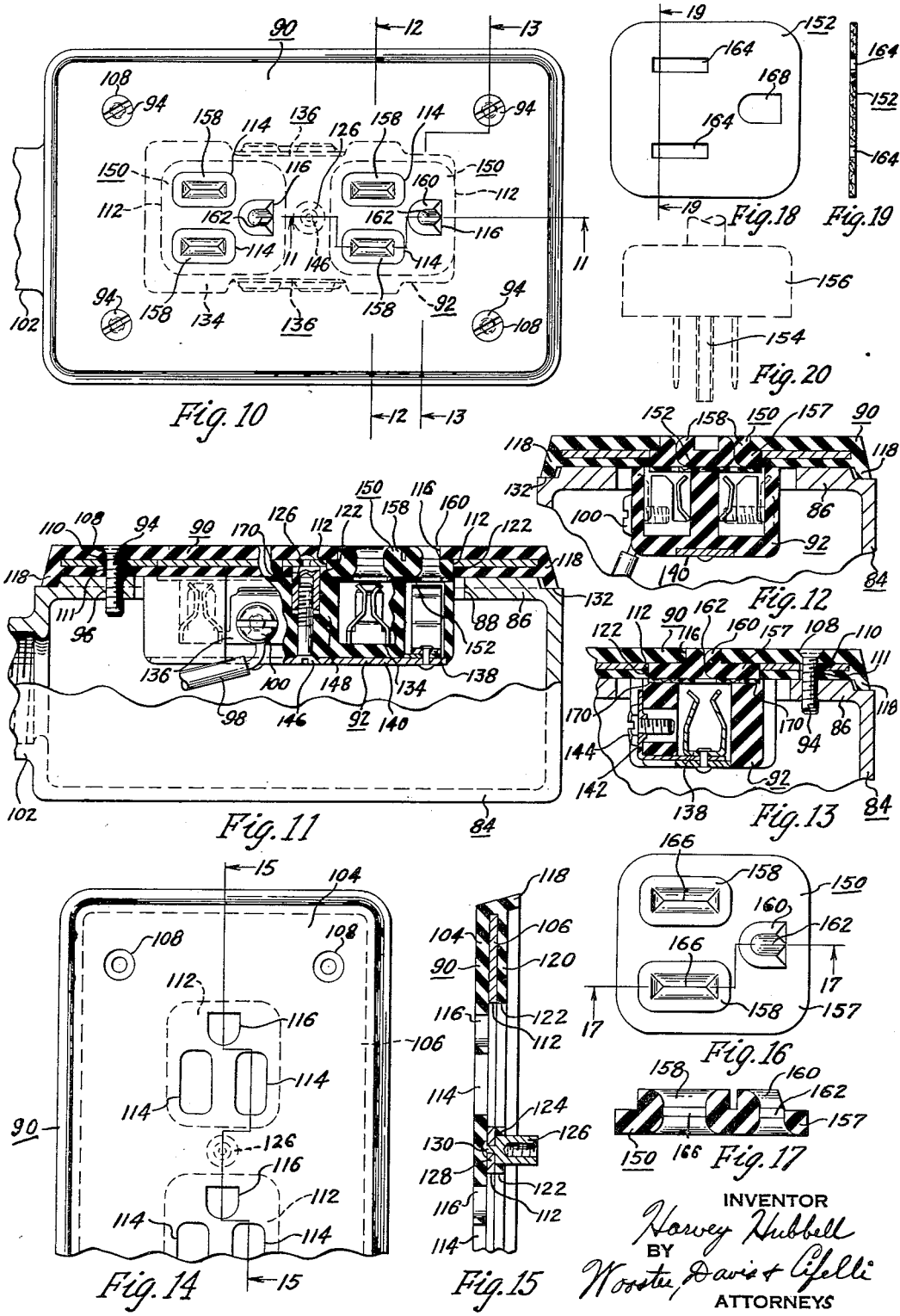

United States Patent Office 3,096,132
Patented July 2, 1963

3,096,132
SEALED ELECTRICAL RECEPTACLES
Harvey Hubbell, Southport, Conn., assignor to Harvey Hubbell, Incorporated, Bridgeport, Conn., a corporation of Connecticut
Filed May 25, 1959, Ser. No. 815,577
2 Claims. (Cl. 339—36)

This invention relates generally to electrical wiring devices, particularly to electrical receptacles, and more particularly to electrical receptacles that are sealed so as to be waterproof.

It is highly important in many electrical wiring device applications, such as marine and certain industrial installations, that the wiring devices be sealed in a waterproof manner. This is particularly true of electrical receptacles, and it is desirable in such applications that the electrical receptacle be sealed in a waterproof manner both when a cooperating electrical plug is connected thereto and when it is disconnected therefrom.

It is an object of this invention to provide an improved electrical receptacle which is particularly well suited for marine installations and similar applications, because it is sealed in a waterproof manner at all times.

The object of my invention is accomplished in one form by providing in association with an electrical wiring device of the receptacle type sealing means in the form of one or more resilient sealing inserts, and associating said means therewith in such a manner that the device is sealed in a waterproof manner at all times and yet permit the usual male electrical contact fingers of an electrical plug to pass through said means and engage the usual female electrical contacts that are disposed within the receptacle.

The above and other objects of my invention and further details of that which I believe to be novel and my invention will be clear from the following description and claims taken with the accompanying drawings wherein:

FIG. 1 is a front elevational view of a sealed waterproof duplex electrical receptacle which incorporates the invention, with portions broken away and shown in section for the sake of clarity;

FIG. 2 is a partial side elevational view and a partial sectional view taken substantially on line 2—2 of FIG. 1;

FIG. 3 is a sectional view taken substantially on line 3—3 of FIG. 1;

FIG. 4 is a plan view of a sealing insert;

FIG. 5 is a side elevational view thereof;

FIG. 6 is a sectional view taken substantially on line 6—6 of FIG. 4;

FIG. 7 is a plan view of a protective insert;

FIG. 8 is a sectional view taken substantially on line 8—8 of FIG. 7;

FIG. 9 is a wiring diagram of a representative electrical circuit which includes the improved electrical receptacle;

FIG. 10 is a front elevational view of a modified electrical receptacle, one which is mounted on the cover plate of a sealed, conduit supported, electrical outlet box, which incorporates the invention;

FIG. 11 is a partial side elevational view with portions broken away for clarity, and a partial sectional view taken substantially on line 11—11 of FIG. 10;

FIG. 12 is a sectional view taken substantially on line 12—12 of FIG. 10;

FIG. 13 is a sectional view taken substantially on line 13—13 of FIG. 10;

FIG. 14 is a fragmentary front elevational view of the sealing cover plate for the electrical outlet box;

FIG. 15 is a sectional view taken substantially on line 15—15 of FIG. 14;

FIG. 16 is a plan view of a sealing insert;

FIG. 17 is a sectional view taken substantially on line 17—17 of FIG. 16;

FIG. 18 is a plan view of a protective insert;

FIG. 19 is a sectional view taken substantially on line 19—19 of FIG. 18, and

FIG. 20 is a schematic representation of a three wire electrical plug which is adapted to be used with the modified receptacle.

In the drawings, two modifications of the invention are illustrated. In FIGS. 1-8, one modification of the invention is illustrated as being incorporated in a duplex electrical receptacle, which is of generally known construction and adapted to be directly secured to an electrical outlet box or other supporting means. In FIGS. 10 through 19, another modification of the invention is illustrated as being incorporated in a completely sealed, conduit supported, electrical outlet box. It will be understood by those skilled in the art that both modifications incorporate the basic inventive concept involved herein, and that with appropriate obvious changes, the invention may be incorporated generally into other types of wiring devices, and particularly into other types of electrical receptacles.

The first modification comprises a duplex electrical receptacle which includes a main body made of electrical insulating material that generally comprises a base 10 and the cover 12. The base and cover are secured together by any convenient securing means, such as the illustrated headed topped rivet 14 which is received in appropriate openings in the base and cover, and in the mounting yoke 16, which has the usual apertured mounting ears 18 for mounting the entire receptacle directly to an electrical outlet box, supporting wall or the like.

The base 10 comprises a recessed and compartmented, walled member having a bottom wall 20, U-shaped end vertical walls 22 having spaced opposed vertical edges, and internal upstanding walls 24 which form a vertically extending, irregularly-shaped socket 26.

The base 10 supports two electrical contact and terminal units 28, one on each side thereof. Each unit 28 comprises a binding wall portion 30 and a pair of female electrical contact portions 32, one at each end of said portion. The binding wall portions 30 close the vertical openings 34 on each side of the body 10 which generally extend between the spaced opposing vertical edges of the end walls 22. The contact portions 32 of the units 28 are individually disposed in separate corner compartments 36 of the base. As illustrated, each binding wall portion 30 has a pair of terminal binding screws 38 adjustably secured thereto which may receive conventional electrical leads 40 in a known manner to wire the receptacle in an electrical circuit. As illustrated, each of the contact portions 32 is of the known clip type that is designed to receive a pair of male electrical contact fingers that are either disposed parallel to or coplanar with each other; however, in the illustrated modification of the invention, only parallel contact fingers will be employed.

The cover 12 comprises a generally flat wall 42 having a pair of spaced, raised portions 44 on its front side, and a non-circular, depending portion 46 on its rear side, which is adapted to be received in the socket 26 of the base to properly orient the base and cover when they are secured to each other. Each of the raised portions 44 has opening means extending therethrough in the form of a pair of spaced, generally oval openings 48 which face toward the front of the cover. Each pair of openings 48 communicates with a large generally oval recess 50 formed on the rear side of the cover. Each recess 50 has a generally rectangular, cut-away portion 52 communicating with it which extends transverse to the cover completely through the sides of wall 42. The associated openings 48, recesses 50 and cut-away portions 52 place the interior of the receptacle body into communcation with the exterior thereof in such a manner that a pair of electrical contact fingers of an electrical plug may extend through cover 12 and be connected to a pair of female electrical contact portions 32 in either end of the receptacle.

As can best be seen in FIGS. 1 and 2, the base 10 has a pair of spaced ribs 54 formed on its exterior at each of its ends which cooperate with cut-away portions 52 formed in the ends of the cover wall 42 to accommodate portions of the mounting yoke 16 and aid in mounting the receptacle. The receptacle structure described thus far may be considered, in general, to be the prior art setting for my invention. It will be noted that the receptacle construction set forth thus far is not sealed, and that water and moisture could enter the receptacle body through the openings 48, which in practice in prior art constructions would be substantially smaller than appears in the drawings, and more in the nature of narrow slots. To render the prior art constructions sealed in a waterproof manner, one or more sealing inserts 58, depending on whether a duplex or single receptacle is involved, the construction of which can be most clearly seen in FIGS. 4–6, is utilized, one for each pair of openings 48.

Each sealing insert 58 is made of a resilient material, such as a natural or synthetic rubber, silicone rubbers having been found to be highly successful in practice. Each sealing insert comprises a main body portion 60, which in plan view is generally planar and rectangular with rounded corners and has a positioning cut-out portion 62 on one side thereof, and two, similar, raised, projecting portions 64 formed on one side thereof. The sealing inserts 58 may be conveniently formed by molding or an equivalent process. Each raised portion 64 has an elongated indentation 66 formed therein which function as entrance portions. Centrally through each indentation 66 there is formed a knife cut slit 68.

Each knife cut slit provides two, opposed, flat wall portions 70 which normally are tightly engaged, thereby closing the slits in a sealed waterproof manner. The slits 68, however, are adapted to be temporarily transformed into open slots for permitting the passage of the male electrical contact fingers of an electrical plug, by having their walls 70 forced apart by said fingers when they are moved into engagement. During such movement, the entrance portions 66 guide the ends of the male electrical contact fingers into the slits 68. Therefore, the slits 68 are tightly closed in watertight fashion when an electrical plug is not connected to the receptacle, and tightly embrace the plug's contact fingers when it is connected to a receptacle; in both conditions, the receptacle is sealed. This obtains, because the sealing inserts 58 are mounted in the cover 12 so as to completely close the openings 48, as is illustrated in FIGS. 1, 2 and 3. When so mounted in the cover 12, each sealing insert 58 is positioned by its positioning portion 62 engaging an end of depending portion 46, and has its raised portions 64 disposed in a pair of openings 48, and its planar portion 58 disposed in a recess 50. The sealing inserts 58, the openings 48 and the recesses 50 are dimensionally related so that when mounted, each insert 58 seals the openings 48 in a waterproof manner and prevents the passage of water and moisture through the cover 12. When it is desired to connect an electrical plug to the receptacle, its male electrical contact fingers are inserted through the slits 68 of one of the sealing inserts 58, being guided therein by entrance portions 66, and part the slit walls 70 and pass through the sealing insert and cover 12 until they engage the receptacle female contact portions 32.

It will, therefore, be apparent that the electrical receptacle disclosed in FIGS. 1–8 is waterproof, and rendered so by the novel sealing inserts and cooperating receptacle structure. In order to protect the sealing inserts 58 from the deleterious effects of any flame that results from electrical arcing within the receptacle, one or more protective inserts 72, depending on the number of sealing inserts that are employed, which can be most clearly seen in FIGS. 7 and 8, is utilized, one with each sealing insert. Each protective insert 72 comprises a generally rectangular hard fiber board 74 having spaced, parallel slots 76 and a cut-out positioning portion 78 formed therein. When finally mounted in the receptacle body, each protective insert 72 is positioned by its portion 78 engaging an end of depending portion 46 and is received in a cover cut-away portion 52 (see FIG. 2), and is contiguous with the rear side of the planar body portion 60 of its associated sealing insert. Each protective insert 72 is made of a flame-resistant electrical insulating material, and therefore, it protects its associated sealing insert from arcing flames, and yet permits the passage of male electrical contact fingers through its slots 76, which are in registry with the sealing insert slits 68.

The FIGS. 1–8 electrical receptacle may be disposed in any desired, conventional, electrical circuit, which for purposes of illustration is shown in FIG. 9 as including an illuminating lamp 80 having a controlling switch 82. It can therein be seen that the duplex electrical receptacle may have an electrical plug inserted in either pair of female contact portions 32 at its ends, and if desired, have an additional electrical component, such as the lamp 80, wired to it. As illustrated, each associated pair of female electrical contact portions 32 and the electrical lamp 80 are mounted in parallel electrical relationship in the circuit.

In FIGS. 10 through 19 there is illustrated a modification of the invention which includes the same basic sealing insert and protective insert structure as the first modification, but wherein the electrical receptacle is illustrated as being rigidly secured to the sealing cover plate of a totally sealed, conduit mounted, electrical outlet box. This environment necessitates certain structural changes in the receptacle. It will also be observed that the second modification is illustrated as being of the duplex receptacle type, and as being designed for use with three-wire, electrical cable having one grounding wire.

In FIGS. 10 to 13, the electrical outlet box is designated generally by reference numeral 84 and as having a front wall 86 that is centrally apertured at 88. The sealing cover plate is designated generally as 90, and shown as rigidly supporting on its rear side the electrical receptacle 92. Sealing cover plate 90 is rigidly connected to the outlet box 84 by any convenient securing means, such as securing bolts 94 which pass through appropriate openings in the sealing cover plate and are received in threaded openings 96 in the front wall 86 of the outlet box. When the sealing cover plate is so connected, as shown in FIG. 11, the receptacle 92 which it supports extends through the opening 88 in the outlet box front wall 86 and is disposed on the interior of the outlet box 84. The receptacle may have appropriate electrical leads 98 connected to its terminals 100 in a conventional way, which pass through the internally threaded mounting collar 102 which may be rigidly secured to an electrical conduit in a known way to support the outlet box 84 at a convenient location.

The sealing cover plate 90 comprises a generally planar sealing cover 104, made of a resilient material such as natural or synthetic rubber, having a rigid reinforcing plate 106 preferably made of a metal such as steel, embedded therein (see FIGS. 14 and 15). Sealing cover 104 has front and rear wall portions which straddle plate 106, and a plurality of pierceable portions 108 in its front wall portion which align with openings 110 in the plate 106 and openings 111 in its rear wall portion to permit the passage of securing screws 94. The sealing cover 104 has two spaced sets of openings formed therein which are in registry with the spaced openings 112 formed in the plate 106. Each set of openings in the sealing cover comprises a pair of generally rectangular, spaced, parallel openings 114 and an associated, non-circular opening 116. As can best be seen in FIG. 15, the sealing cover 104 includes a rearwardly extending peripheral flange 118 and a pair of openings 122 in its rear portion, that is designated by reference numeral 120, which are in registry with the openings 112 in the plate 106. Centrally of the rear wall portion 120, there is formed a circular opening 124 which permits the passage of a retaining bushing 126 that is rigidly secured at one of its ends to a central portion 128 of the rigid plate 106, as by the integral rivet-like securement 130. When the sealing cover plate 90 is secured to the outlet box 84, the peripheral flange 118 is in tight frictional engagement with the peripheral offset shoulder 132 of the front wall of the outlet box and thereby seals the cover plate-outlet box connection.

The receptacle 92 comprises a generally rectangular, box-like, walled member 134 that houses a pair of spaced, electrical contact and terminal units 136 which are generally similar to the units 28 of the first modification, and which have their female electrical contact portions in registry with the openings 114 in the sealing cover 104. As can best be seen in FIGS. 11 and 13, the receptacle 92 also includes grounding contacts 138, one associated with each pair of associated female electrical contact portions, that are disposed to be in registry with the openings 116 of the sealing cover 104. The grounding contacts 138 are electrically connected by the elongated bar 140 which has a bent wall 142 that adjustably supports a grounding binding screw 144 (see FIG. 13). The bar 140 has an opening therein which permits the passage of a retaining screw 146 that also passes through an opening in an upstanding portion 148 of the receptacle and is threadedly received in the retaining bushing 126 to firmly secure the receptacle 92 on the cover plate 90. As can best be seen in FIGS. 11, 12 and 13, sealing inserts 150 and associated protective inserts 152 are disposed between the cover plate 90 and the receptacle 92 so as to be firmly positioned and sealed therebetween. The sealing and protective inserts correspond generally in construction and operation to the sealing and protective inserts of the first modification, except that they both include means for permitting the grounding contact finger 154 of a three-wire, electrical plug 156 (see FIG. 20) to pass therethrough and to make contact with a female grounding contact in the receptacle and that they do not have cut-out positioning portions.

As can best be seen in FIGS. 16 and 17, each sealing insert 150 includes a main planar body portion 157, a pair of raised portions 158 which correspond to the raised portions 64 of the sealing inserts of the first modification, and a third raised portion 160 which has a knife-cut slit 162 formed therein that is normally sealingly closed but which is adapted to be parted to have a grounding contact finger inserted therethrough. The construction of the protective inserts 152 can best be seen in FIGS. 18 and 19, where it will be observed that each protective insert has a pair of spaced slots 164 which are arranged to be in registry with the slits 166 in the raised portions 158 of an associated sealing insert 150 when the inserts are assembled, and a slot 168 which is arranged to be in registry with the slit 162 of said associated sealing insert.

As can best be observed in FIGS. 11, 12 and 13, the sealing inserts 150 are disposed between the receptacle 92 and sealing cover plate 90 to tightly close and seal the openings 114, 116, 112 and 122, and yet permit a three-wire, electrical plug, such as the one schematically designated by reference numeral 156 in FIG. 20, to be inserted through the inserts to make both electrical and grounding engagement with the female contacts disposed in the receptacle. The protective inserts 152 are disposed adjacent to their associated sealing inserts and make planar contact with one side of the portions 157. The mounting of inserts 152 is facilitated by recesses 170 formed in the receptacle 92. As in the case of the first modification, the sealing inserts function to seal the receptacle in a waterproof manner, and the protective inserts function to prevent damage to the sealing inserts by any flame which may occur through contact arcing. Therefore, the sealing and protective inserts are made of similar materials to those of their counter-parts of the first modification.

In view of the foregoing, it will be understood that the electrical outlet box 84 is totally and completely sealed in a waterproof manner by virtue of the sealing cover plate 90 effectively sealing its front opening 88, and the sealing inserts 150 effectively sealing the openings 114, 116, 112 and 122 in the cover plate.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A sealed electrical receptacle comprising: a body made of electrical insulating material; said body defining a compartment and having a front wall; a plurality of female electrical contacts disposed in said compartment to the rear of said front wall; a corresponding number of openings in and extending through said front wall communicating with said female electrical contacts whereby the standard male electrical contact fingers of an electrical plug may be inserted through said openings into engagement with said female electrical contacts when the electrical plug is selectively connected to said receptacle, said openings being substantially larger than the standard male electrical contact fingers; a recess in said front wall on the rear side thereof opening to said compartment; said recess surrounding and communicating with said openings; a cut-away portion formed in said front wall on the rear side of and communicating with said recess; a resilient sealing insert supported by said body and normally completely filling, closing and sealing said openings and said recess, said sealing insert comprising a main body portion having a plurality of spaced raised portions thereon, each of said raised portions having a slit therein that extends completely through the sealing insert, said slits corresponding in number to and being in alignment with said female electrical contacts, said main body portion being disposed in said recess and normally completely filling, closing and sealing it, said raised portions being disposed in said openings and normally completely filling, closing and sealing them, said raised portions having yieldable rim portions which surround said slits that are accessible from the exterior of the receptacle and adapted to be deformed when male electrical contact fingers of an electrical plug are inserted through said slits into engagement with said female electrical contacts and thereby transform said slits into slot-like passageways, and said rim portions inherently acting to closely embrace the male electrical contact fingers, whereby said openings are completely sealed prior to and after an electrical plug is connected to said receptacle; and a protective insert made of hard flame-resistant fiber board disposed in said cut-away portion between said sealing insert and said female electrical contacts, said protective insert having a plurality of slots that are disposed to be in registry with said slits.

2. In combination, a sealing cover plate for an electrical outlet box; an electrical receptacle having a plurality of female contacts and rigidly secured to said sealing cover plate; opening means including a plurality of spaced openings formed in said sealing cover plate and communicating with the interior of said receptacle in alignment with said contacts; a resilient sealing insert supported by said sealing cover plate and normally completely filling, closing and sealing said opening means; said sealing insert comprising a main body portion having a plurality of spaced raised portions thereon, each of said raised portions having a slit therein that extends completely through the sealing insert, said slits corresponding in number to and being in alignment with said contacts, the raised portions of said insert having yieldable rim portions which surround said slits and are accessible from the exterior of the outlet box and adapted to be deformed when standard male electrical contact fingers of an electrical plug are inserted through said slits into engagement with said female electrical contacts and thereby transform said slits into slot-like passageways, and said rim portions inherently acting to closely embrace the male electrical contact fingers, whereby said openings are completely sealed prior to and after an electrical plug is connected to said receptacle; a recess formed in said receptacle adjacent said insert; and a protective insert made of flame-resistant material disposed in said recess between said insert and said contacts, said protective insert having a plurality of slots that are in registry with said slits.

References Cited in the file of this patent

UNITED STATES PATENTS

| | | |
|---|---|---|
| 2,005,684 | Sachs | June 18, 1935 |
| 2,146,829 | MacFarlane et al. | Feb. 14, 1939 |
| 2,154,159 | Hamilton | Apr. 11, 1939 |
| 2,239,653 | O'Brien | Apr. 22, 1941 |
| 2,279,516 | O'Brien | Apr. 14, 1942 |
| 2,440,279 | Larkins | Apr. 27, 1948 |
| 2,524,250 | Bierce | Oct. 3, 1950 |
| 2,619,515 | Doane | Nov. 25, 1952 |
| 2,631,819 | Duncan | Mar. 17, 1953 |
| 2,641,627 | Lewis | June 9, 1953 |
| 2,700,140 | Phillips | Jan. 18, 1955 |
| 2,907,596 | Maha | Oct. 6, 1959 |

FOREIGN PATENTS

| | | |
|---|---|---|
| 950,206 | Germany | Oct. 4, 1956 |